(12) United States Patent
Sugioka et al.

(10) Patent No.: US 11,999,024 B2
(45) Date of Patent: Jun. 4, 2024

(54) SCREW FASTENING FAULT ASSESSMENT DEVICE, SCREW FASTENING DEVICE, SCREW FASTENING FAULT ASSESSMENT METHOD, AND CONTROL PROGRAM

(71) Applicant: OMRON Corporation, Kyoto (JP)

(72) Inventors: Masayuki Sugioka, Kyoto (JP); Tatsuya Sasaki, Otsu (JP); Koji Nishigaki, Kusatsu (JP); Takanori Shibutani, Otsu (JP)

(73) Assignee: OMRON Corporation, Kyoto (JP)

( * ) Notice: Subject to any disclaimer, the term of this patent is extended or adjusted under 35 U.S.C. 154(b) by 406 days.

(21) Appl. No.: 17/424,880

(22) PCT Filed: Feb. 20, 2020

(86) PCT No.: PCT/JP2020/006802
§ 371 (c)(1),
(2) Date: Jul. 21, 2021

(87) PCT Pub. No.: WO2020/175316
PCT Pub. Date: Sep. 3, 2020

(65) Prior Publication Data
US 2022/0080540 A1 Mar. 17, 2022

(30) Foreign Application Priority Data
Feb. 27, 2019 (JP) .................................. 2019-034207

(51) Int. Cl.
*B23P 19/06* (2006.01)
*B25J 9/16* (2006.01)

(52) U.S. Cl.
CPC ........... *B23P 19/066* (2013.01); *B25J 9/1679* (2013.01)

(58) Field of Classification Search
CPC ..... B23P 19/066; B25J 9/1679; B25B 23/147; B25B 23/145; G01L 5/24
USPC .. 73/862.08, 862.541, 761, 805, 847, 865.8, 73/865.9; 340/500, 540, 635, 665, 679; 29/407.01, 407.02, 407.05
See application file for complete search history.

(56) References Cited

U.S. PATENT DOCUMENTS 7,458,282 B1   12/2008 Wuester et al.

FOREIGN PATENT DOCUMENTS

| CN | 103240586 | 8/2013 |
| CN | 104259840 | 1/2015 |

(Continued)

OTHER PUBLICATIONS

"Office Action of China Counterpart Application" with English translation thereof, issued on Nov. 18, 2022, p. 1-p. 19.

(Continued)

*Primary Examiner* — Robert R Raevis
(74) *Attorney, Agent, or Firm* — JCIPRNET (57) ABSTRACT

The present invention provides technology with which it is possible to highly accurately assess the quality of fastening of a screw. The present invention comprises a position acquisition unit (13) that acquires the axial-direction position of a driver (50), and a fault assessment unit (14) that assesses that a fault has occurred in fastening of a screw when the amount of change in the axial-direction position of the driver (50) from when temporary seating occurred is greater than a threshold value. The present invention provides a technology with which the quality of screw fastening can be assessed with high precision.

9 Claims, 9 Drawing Sheets

(56) References Cited

FOREIGN PATENT DOCUMENTS

| | | |
|---|---|---|
| CN | 107322278 | 11/2017 |
| CN | 207577837 | 7/2018 |
| JP | H06304826 | 11/1994 |
| JP | H07223132 | 8/1995 |
| JP | H10138058 | 5/1998 |
| JP | 2001179646 A * | 7/2001 |
| JP | JP-WO2008105057 A1 * | 6/2010 |
| JP | 2012171071 | 9/2012 |
| JP | 2012223841 | 11/2012 |
| JP | 2013018067 | 1/2013 |
| JP | 2013059816 | 4/2013 |
| JP | 3204973 | 6/2016 |
| JP | 2017013175 | 1/2017 |

OTHER PUBLICATIONS

"Search Report of Europe Counterpart Application", issued on Oct. 31, 2022, p. 1-p. 8.
"International Search Report (Form PCT/ISA/210) of PCT/JP2020/006802," mailed on Apr. 21, 2020, with English translation thereof, pp. 1-4.
"Written Opinion of the International Searching Authority (Form PCT/ISA/237) of PCT/JP2020/006802," mailed on Apr. 21, 2020, with English translation thereof, pp. 1-8.

* cited by examiner

SCREW FASTENING FAULT ASSESSMENT DEVICE, SCREW FASTENING DEVICE, SCREW FASTENING FAULT ASSESSMENT METHOD, AND CONTROL PROGRAM

CROSS-REFERENCE TO RELATED APPLICATION

This application is a 371 application of the International PCT application serial no. PCT/JP2020/006802, filed on Feb. 20, 2020, which claims the priority benefit of Japan Patent Application No. 2019-034207, filed on Feb. 27, 2019. The entirety of each of the above-mentioned patent applications is hereby incorporated by reference herein and made a part of this specification.

BACKGROUND

Technical Field

The present invention relates to a screw fastening fault assessment device, a screw fastening device, a screw fastening fault assessment method, and a control program.

Related Art

Conventionally, a technology has been known for assessing the quality of screw fastening depending on whether the amount of change in rotation of a bit axis is within a predetermined range in a screw fastening device which includes an electric driver that is axially moved in a vertical direction (for example, see Patent literature 1).

LITERATURE OF RELATED ART

Patent Literature

Patent literature 1: Japanese Patent Laid-Open No. 7-223132

SUMMARY

However, with the technology described in Patent literature 1, there may be a case in which the quality of screw fastening cannot be accurately assessed due to the influence of a screw tolerance or the like. For example, when a screw inserted into a screw hole is rotated to be fastened, the screw is stretched. Therefore, the amount of change in rotation of the bit axis changes according to stretch of the screw. In addition, because the amount of rotation is affected by a friction between the screw and an object to be fastened, a variation in a torque, or the like, there is a problem that an erroneous assessment may occur when the quality of screw fastening is assessed based on the amount of change in the rotation of the bit axis.

An aspect of the present invention is to provide a technology capable of assessing the quality of screw fastening with high precision.

In order to solve the above problems, a screw fastening fault assessment device according to one aspect of the present invention includes a position acquisition unit that acquires an axial position of a driver, and a fault assessment unit which assesses that a fault has occurred in screw fastening when the amount of change in the axial position of the driver from the time of temporary seating is greater than a threshold value in a final fastening process after a screw is inserted into a screw hole and the screw is temporarily seated.

According to the aspect of the present invention, the quality of the screw fastening can be assessed with high precision.

DESCRIPTION OF THE EMBODIMENTS

Hereinafter, an embodiment according to an aspect of the present invention (hereinafter, also referred to as "the embodiment") is described with reference to the drawings.

§ 1 Application Example

Figure 1:
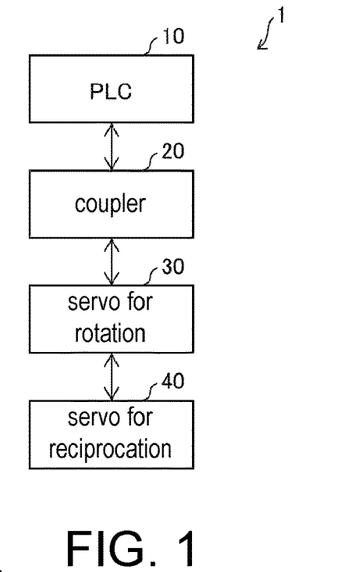
FIG. 1 is a block diagram showing an outline of a screw fastening system according to an embodiment of the present invention.

FIG. 1 is a block diagram showing an outline of a screw fastening system 1 according to the embodiment of the present invention. As shown in FIG. 1, the screw fastening system 1 includes a programmable logic controller (PLC) 10 (screw fastening fault assessment device), a coupler 20, a servo for rotation 30 (first motor), and a servo for reciprocation 40 (second motor). The screw fastening system 1 performs a screw fastening operation by a rotational motion around an axis and a reciprocating motion to an axial direction of a driver 50 described later (see FIG. 3). At this time, the PLC 10 controls the screw fastening operation and assesses the occurrence of a fault in this screw fastening operation.

In the present specification, a fault in the screw fastening operation means a state in which a screw does not exert a sufficient fastening force or a state in which a foreign matter is clamped under a seat surface of the screw even though a specified torque is applied to this screw. Particularly, a fault caused by the following reasons is assessed.

Bottoming: the screw fastening operation is stopped halfway because the screw is longer than a screw hole, the foreign matter is accumulated in the screw hole, or the like;

and

Foreign matter clamping: the foreign matter is clamped under the seat surface of the screw.

The servo for rotation 30 is a motor that generates the rotational motion around the axis (a motion in an R-axis direction) of the driver 50. In addition, the servo for rotation 30 outputs a rotation speed (deg./s), the amount of rotation (deg.), and a rotation torque (a ratio (%) with respect to a rated torque) of the servo for rotation 30 to the coupler 20.

The servo for reciprocation 40 is a motor that generates the reciprocating motion to the axial direction (a motion in a Z-axis direction) of the driver 50. In addition, the servo for reciprocation 40 outputs a moving speed (mm/s), a moving position (mm), and a moving torque (a ratio (%) with respect to the rated torque) of the driver 50 due to a rotation of the servo for reciprocation 40 to the coupler 20.

The coupler 20 connects the PLC 10 to the servo for rotation 30 and the servo for reciprocation 40. Specifically, the coupler 20 transmits a control signal received from the PLC 10 to the servo for rotation 30 and the servo for reciprocation 40. In addition, the coupler 20 transmits the rotation speed, the amount of rotation and the rotation torque of the servo for rotation 30 which are received from the servo for rotation 30 to the PLC 10. In addition, the coupler 20 transmits the moving speed, the moving position, and the moving torque of the driver 50 due to the rotation of the servo for reciprocation 40 which are received from the servo for reciprocation 40 to the PLC 10.

In the following description, the rotation speed, the amount of rotation, and the rotation torque of the servo for rotation 30, and the moving speed, the moving position, and the moving torque of the driver 50 due to the rotation of the servo for reciprocation 40 may be collectively referred to as parameters.

Figure 2:
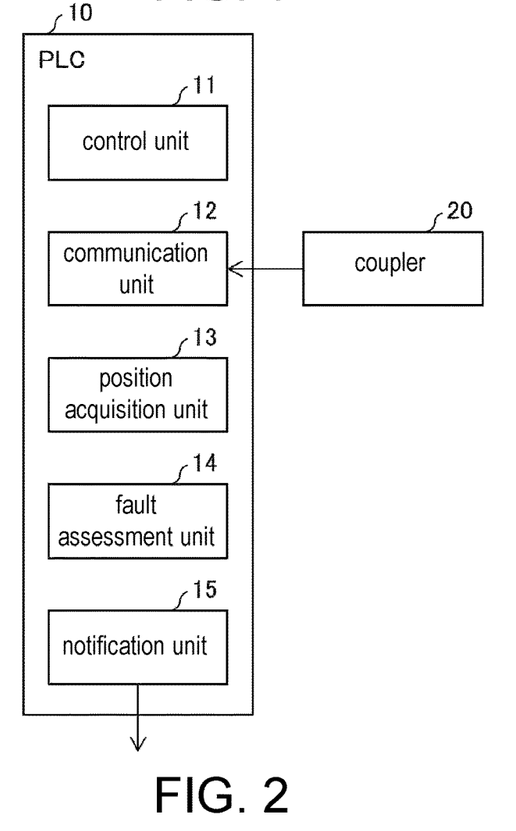
FIG. 2 is a block diagram showing a configuration of a PLC.

FIG. 2 is a block diagram showing the configuration of the PLC 10. The PLC 10 controls an operation of the screw fastening system 1. As shown in FIG. 2, the PLC 10 includes a control unit 11, a communication unit 12, a position acquisition unit 13, a fault assessment unit 14, and a notification unit 15.

The control unit 11 outputs the control signal for controlling the servo for rotation 30 and the servo for reciprocation 40 to the communication unit 12. The communication unit 12 transmits the control signal input from the control unit 11 to the coupler 20. The control signal is transmitted to the servo for rotation 30 and the servo for reciprocation 40 via the coupler 20 to control the servo for rotation 30 and the servo for reciprocation 40. The control unit 11 controls the servo for rotation 30 and the servo for reciprocation 40 in synchronization with each other. In addition, the control unit 11 feeds back the parameters of the servo for rotation 30 and the servo for reciprocation 40 to the controls of this servo for rotation 30 and this servo for reciprocation 40.

The communication unit 12 receives the parameters from the servo for rotation 30 and the servo for reciprocation 40 via the coupler 20. The communication unit 12 stores the received parameters in a storage device (not shown). In addition, the screw fastening system 1 may include the storage device for storing the received parameters.

The position acquisition unit 13 acquires, with reference to the parameters received from the coupler 20 by the communication unit 12, the rotation speed, the amount of rotation, and the rotation torque of the servo for rotation 30 and the moving speed, an axial position, and the moving torque of the driver 50 due to the servo for reciprocation 40. The position acquisition unit 13 may acquire the parameters from the communication unit 12, or may acquire the parameters from the storage device. The position acquisition unit 13 acquires the axial position of the driver 50 based on these parameters.

The fault assessment unit 14 assesses whether a fault has occurred in screw fastening with reference to the axial position of the driver 50 acquired by the position acquisition unit 13. Specifically, the fault assessment unit 14 assesses whether a fault has occurred in screw fastening based on whether the amount of change in the axial position of the driver 50 is greater than a predetermined threshold value.

When the fault assessment unit 14 assesses that a fault has occurred in the screw fastening, the notification unit 15 notifies the occurrence of the fault. By notifying the coupler 20 of the occurrence of the fault by the notification unit 15, the PLC 10 may stop the operations of the servo for rotation 30 and the servo for reciprocation 40. In addition, the PLC 10 may be able to notify an external machine of the occurrence of the fault in the screw fastening by the notification unit 15.

§ 2 Configuration Example

Embodiment 1

Hereinafter, Embodiment 1 of the present invention is described in detail.

(Configuration of Screw Fastening System 1)

Figure 3:
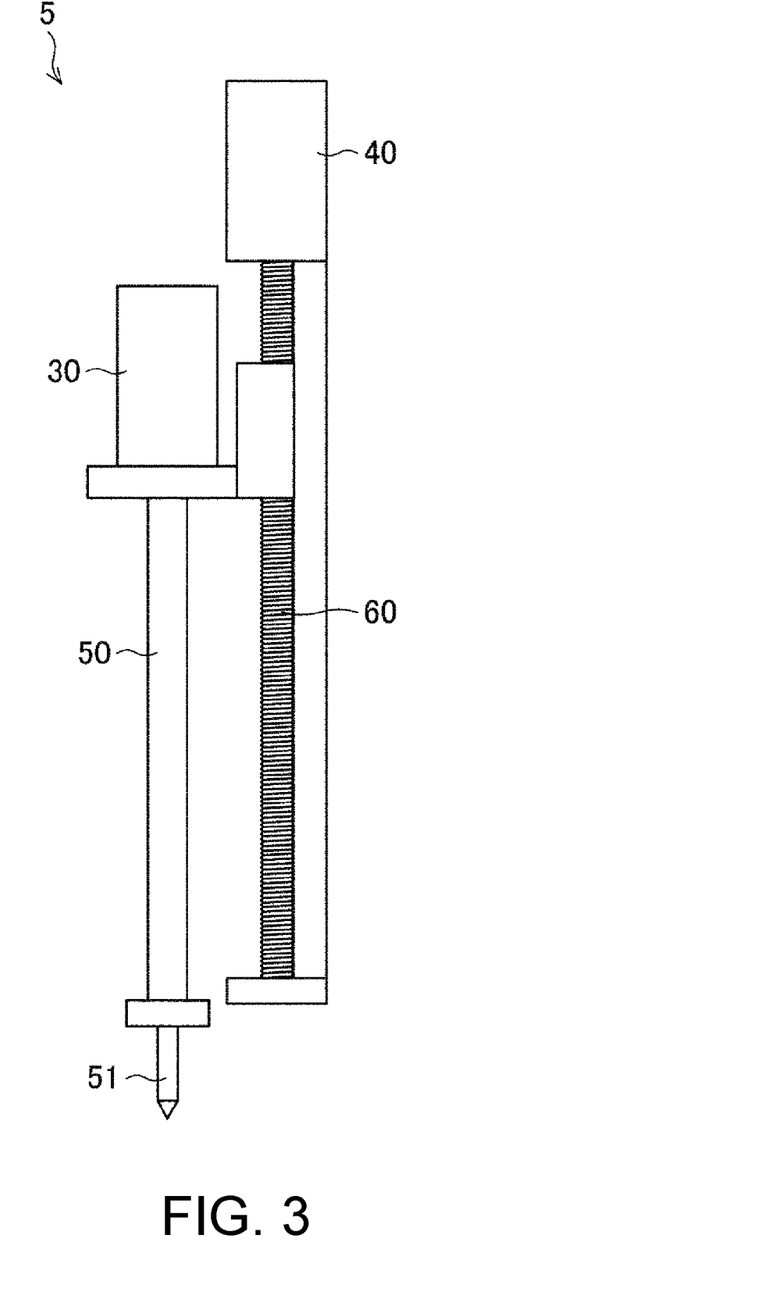
FIG. 3 is a diagram showing an external configuration of the screw fastening system according to the embodiment.

FIG. 3 is a diagram simply showing a configuration example of an appearance of the screw fastening system 1 according to the embodiment. As shown in FIG. 3, the screw fastening system 1 includes a screw fastening device 5 having the servo for rotation 30 (first motor), the servo for reciprocation 40 (second motor), the driver 50, and a ball screw 60, and the PLC 10 and the coupler 20 described above which are not shown in FIG. 3.

The driver 50 has a driver bit 51 at a front end and performs the screw fastening. The driver 50 executes the screw fastening operation in a manner of rotating around the axis by the rotation torque applied by the servo for rotation 30 and moving in the axial direction by the servo for reciprocation 40. In the following description, a direction in which the driver 50 moves during the screw fastening in the axial direction of the driver 50 is referred to as downward.

The servo for rotation 30 is arranged above the driver 50, and generates the rotational motion around the axis of the driver 50.

The ball screw 60 integrally supports the driver 50 and the servo for rotation 30 in a manner that the driver 50 can be moved up and down.

The servo for reciprocation 40 is arranged above the ball screw 60, and generates a rotational motion of the ball screw 60. The rotational motion of the ball screw 60 generated by the servo for reciprocation 40 is converted into a linear motion of the driver 50 in the vertical direction, and the driver 50 reciprocates up and down.

(Screw Fastening Operation)

The screw fastening operation performed by the screw fastening system 1 is as follows.

First, the control unit 11 executes a lowering process of lowering the driver 50 by the rotational motion of the ball screw 60 in a manner that a screw is held at a front end of the driver bit 51 by, for example, adsorption, and in this state, this screw is arranged at a location where screw fastening of an object to be fastened is performed. In the lowering process, the control unit 11 lowers the driver 50 until the screw is about to enter the screw hole of the object to be fastened. When a Z-axis position of the driver 50 reaches a predetermined position, the control unit 11 completes the Z-axis positioning.

Next, the control unit 11 executes a temporary seating process of pressing the driver 50 with the screw being rotated until the screw is temporarily seated. Here, the "temporary seating" refers to a state when the seat surface of the screw is in contact with the object to be fastened, and in appearance, is a state when the screw is in the screw hole.

The control unit 11 performs the temporary seating process, in which the screw is inserted into the screw hole of the object to be fastened and this screw is temporarily seated, until the rotation torque (R-axis torque) applied to the driver 50 reaches a first torque smaller than a fastening torque of the screw. The fastening torque of the screw is a torque determined by JIS or various regulations according to, for example, the type of screw. The first torque is, for example, a torque when a rated output of the servo for rotation 30 is 50% or more. The control unit 11 performs the temporary seating process until the screw is temporarily seated.

Meanwhile, at an initial stage of the temporary seating process, when the insertion of the screw into the screw hole of the object to be fastened is started, a R-axis torque is higher than a torque when an output of the servo for rotation 30 is 50% or more of the rated output of the servo for rotation 30. Therefore, in order to avoid erroneous assessment of temporary seating, for example, the control unit 11 does not assess the completion of temporary seating within 1000 ms from the start of the temporary seating process.

Subsequently, after the screw is temporarily seated, the control unit 11 performs a final fastening process in which the screw is further rotated and the driver 50 is pressed against the screw. The final fastening process after the temporary seating process is performed until the rotation torque applied to the driver 50 by the servo for rotation 30 reaches a second torque which is a specified fastening torque. The control unit 11 performs the final fastening process until, for example, the R-axis torque is a torque when the output of the servo for rotation 30 is 150% or more of the rated output of the servo for rotation 30.

After the final fastening process is completed, the control unit 11 executes a final fastening holding process in which the rotation torque of the servo for rotation 30 and a pressing torque of the servo for reciprocation 40 are held at a final fastening state for a predetermined time. In the final fastening holding process, the control unit 11 holds the final fastening state for, for example, 100 milliseconds.

Thereafter, the control unit 11 executes a release process in which the rotation of the servo for rotation 30 is stopped, the R-axis torque is set to be 0% or less, and the screw is released.

Subsequently, the control unit 11 completes the screw fastening operation by executing an origin return process in which the driver 50 is moved upward by the rotational motion of the ball screw 60 and the Z-axis position of the driver 50 is returned to an origin position.

(Bottoming Assessment)

Next, processing is described in which bottoming is assessed with reference to the amount of change in the axial position of the driver 50 from the time of the temporary seating.

Figure 4:
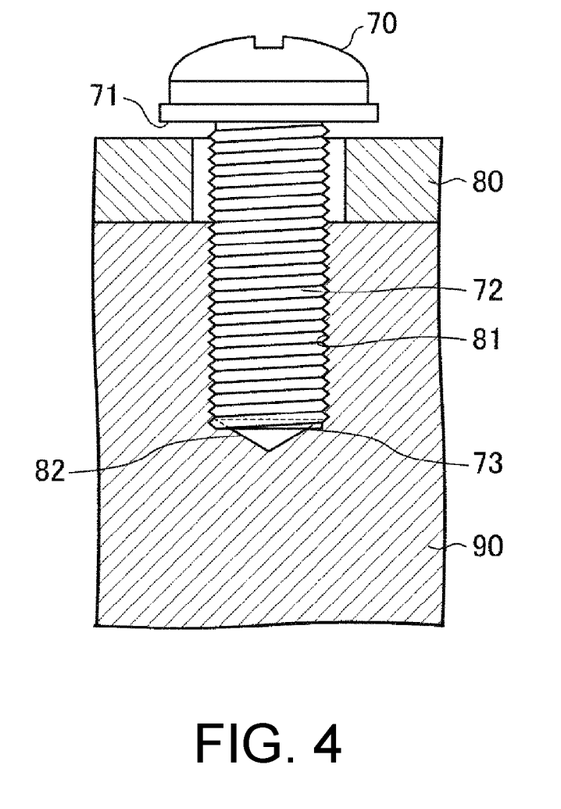
FIG. 4 is a diagram schematically showing a screw having a fault caused by bottoming.
(a) of FIG. 5 is a diagram showing changes in a R-axis position during a final fastening process, and (b) of FIG. 5 is a diagram showing changes in a Z-axis position during the final fastening process.

FIG. 4 is a diagram schematically showing a bottomed screw 70. As shown in FIG. 4, a screw shaft of a screw 70 for fastening an object to be fastened 80 to a workpiece 90 (fastening object) is longer than both a screw hole 81 and the object to be fastened 80. Thereby, in a state in which the screw shaft 72 of the screw 70 is not completely inserted into the screw hole 81, a screw front end 73 reaches a screw hole bottom 82, and a fault caused by the "bottoming" that the screw fastening operation stops halfway may occur. Alternatively, when the foreign matter is accumulated in the screw hole 81, a fault caused by the bottoming may also occur.

Moreover, in the embodiment, the screw fastening operation by the screw fastening system 1 is shown by an example. In the example, the screw fastening is performed to a workpiece that is in a state in which a female screw is cut in advance at a location where the screw fastening is performed (tap).

In the final fastening process described above, the position acquisition unit 13 acquires an R-axis position and a Z-axis position from the coupler 20 via the communication unit 12. Here, the R-axis position is the amount of rotation of the servo for rotation 30, and the Z-axis position is a moving distance from the origin position.

The fault assessment unit 14 assesses whether a fault caused by the bottoming has occurred in the screw fastening based on the axial position of the driver 50 acquired by the position acquisition unit 13.

Figure 5:
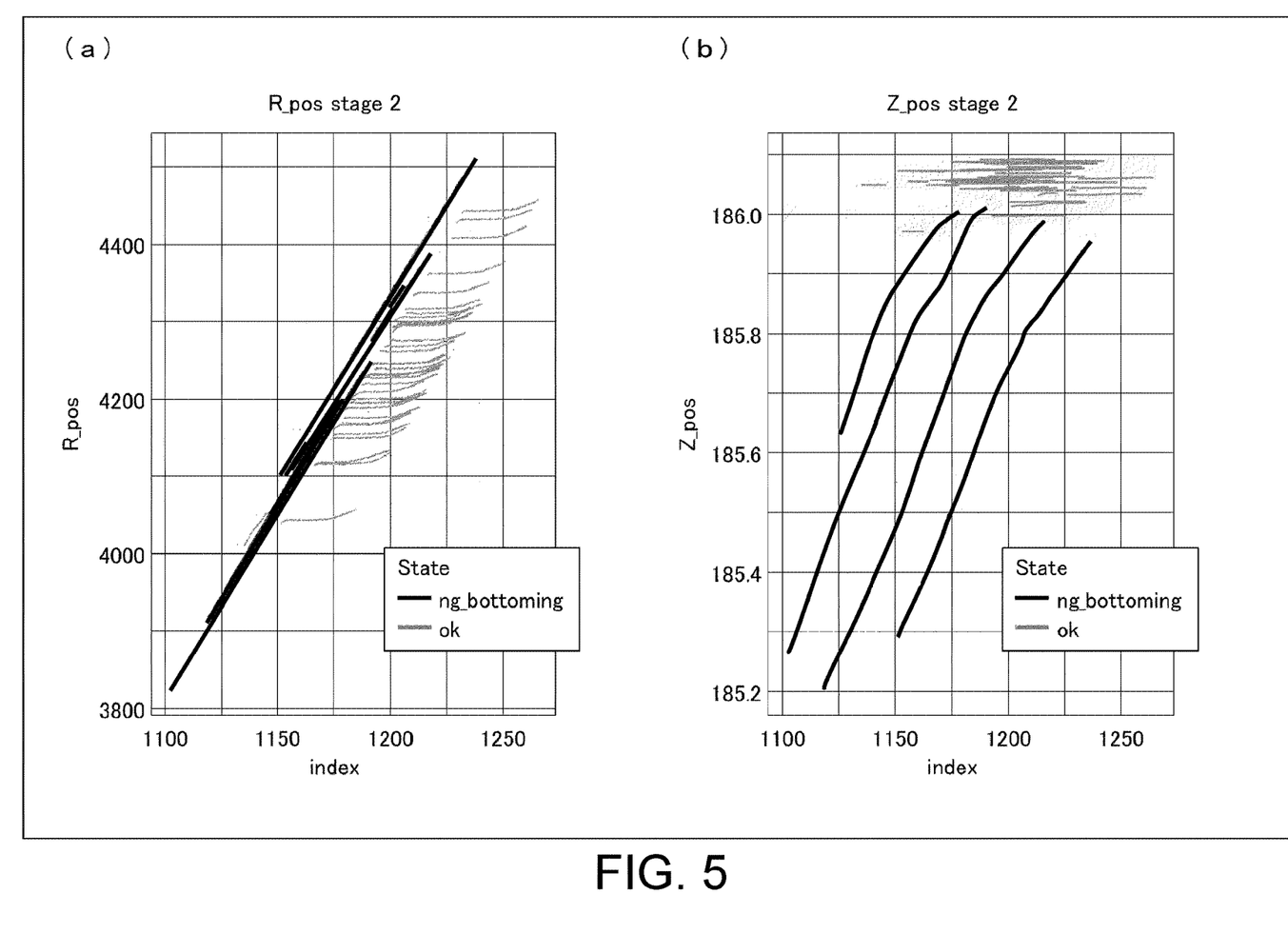

(a) of FIG. 5 is a diagram showing changes in the R-axis position during the final fastening process between a case when the bottoming occurs (ng_bottoming) and a case when the screw fastening operation is completed without any problem (ok). A horizontal axis shows time, and a vertical axis shows the R-axis position. (b) of FIG. 5 is a diagram showing changes in the Z-axis position during the final fastening process between the case when the bottoming occurs (ng_bottoming) and the case when the screw fastening operation is completed without any problem (ok). A horizontal axis shows time, and a vertical axis shows the Z-axis position. In (a) of FIG. 5 and (b) of FIG. 5, as for an index, 1 index indicates 2 msec, and in a case of index=1250, the time is 2.5-second.

Figure 6:
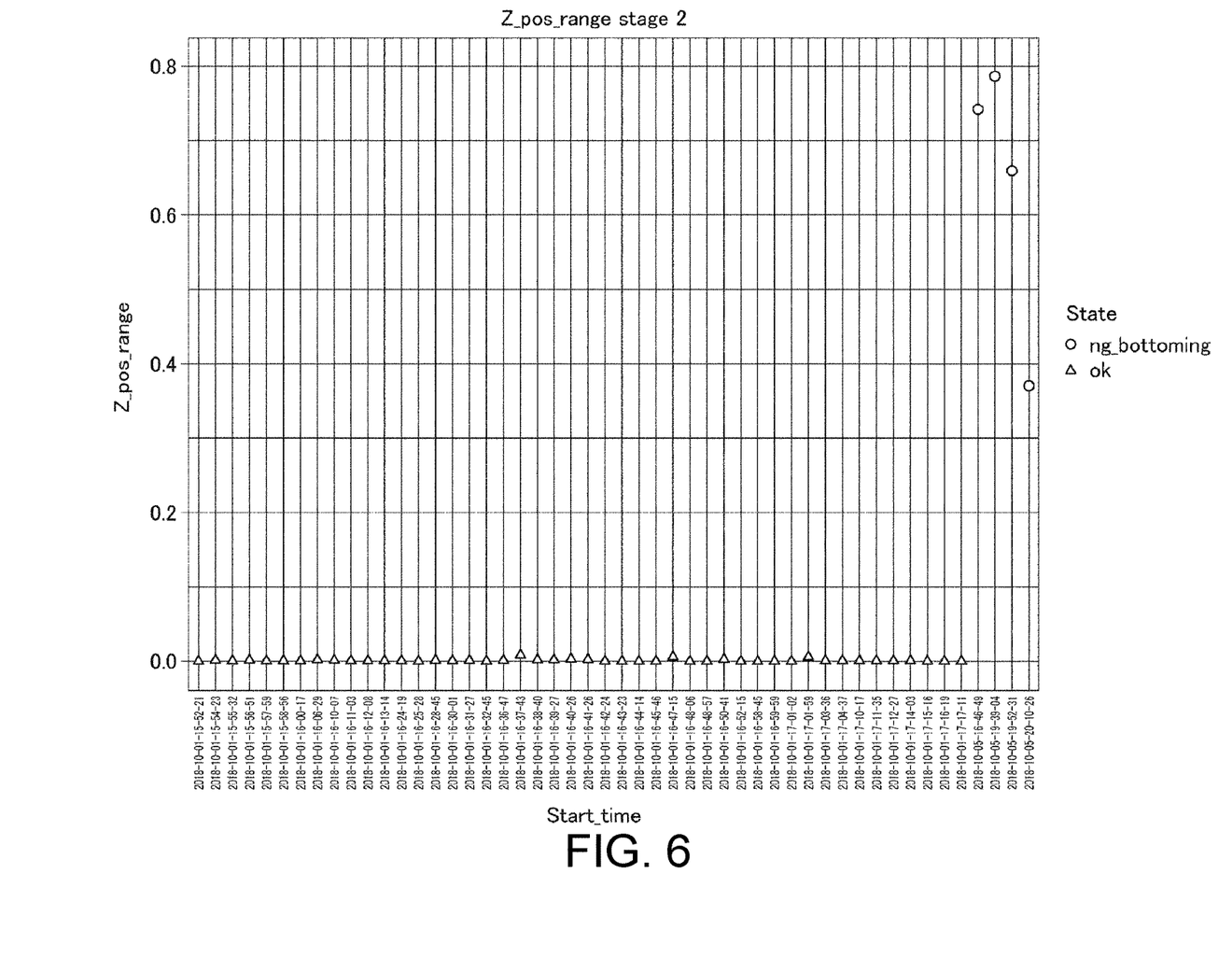
FIG. 6 is a diagram showing the amount of change in the Z-axis position during the final fastening process.

FIG. 6 is a diagram showing the amount of change in the Z-axis position during the final fastening process of each screw between the case when the bottoming occurs (ng_bottoming) and the case when the bottoming does not occur (ok). A horizontal axis shows a start time of screw fastening of each screw, and a vertical axis shows the amount of change in the Z-axis position.

Figure 7:
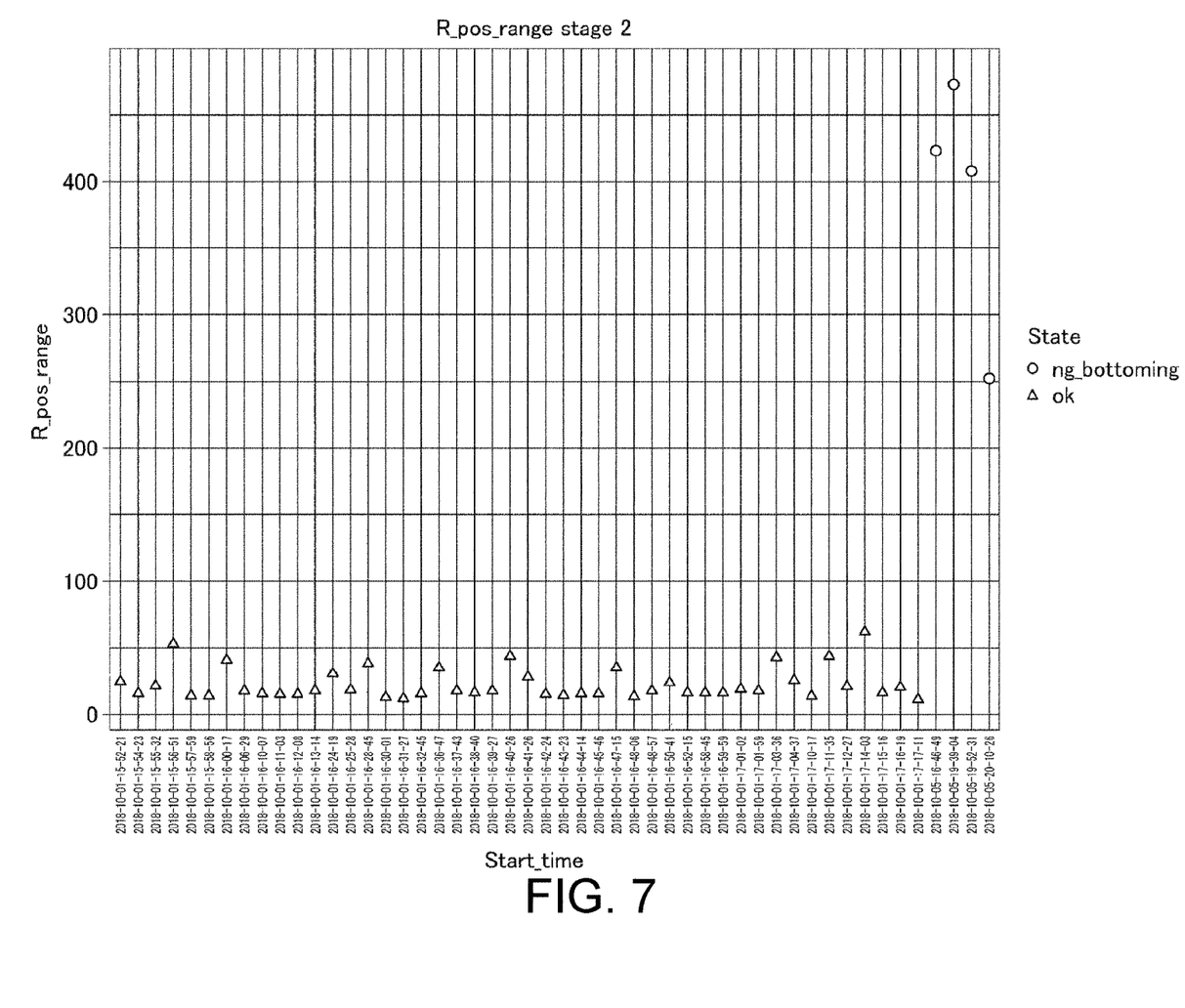
FIG. 7 is a diagram showing the amount of change in the R-axis position during the final fastening process.

FIG. 7 is a diagram showing the amount of change in the R-axis position during the final fastening process of each screw between the case when the bottoming occurs (ng_bottoming) and the case when the bottoming does not occur (ok). A horizontal axis shows a start time of screw fastening of each screw, and a vertical axis shows the amount of change in the R-axis position.

As shown in (a) of FIG. 5 and (b) of FIG. 5, during the final fastening process, the amount of change in the R-axis position and the Z-axis position of the driver 50 associated with changes in time is greater when a fault caused by the bottoming occurs in the screw fastening than when a fault caused by bottoming does not occur. The fault assessment unit 14 assesses that a fault caused by the bottoming has occurred in the screw fastening when the amount of change in the axial position of the driver 50 from the time of the temporary seating is greater than the threshold value in the final fastening process.

As shown in FIG. 6 and FIG. 7, between the amount of change in the R-axis position and the amount of change in the Z-axis position of the driver 50 when a fault caused by the bottoming does not occur, the amount of change in the R-axis position has a greater variation for each screw. This is because the amount of change in the R-axis position is likely to be affected by a friction between the screw and the object to be fastened, a torque variation, or the like.

Furthermore, as shown in FIG. 6, when a fault caused by the bottoming does not occur, the amount of change in the Z-axis position of each screw during the final fastening process hardly varies for each screw fastening operation, and when a fault caused by the bottoming occurs, the amount of change in the Z-axis position of each screw during the final fastening process varies greatly for each screw fastening operation. This is because when a fault caused by the bottoming does not occur, at the start of the final fastening process, a seat surface 71 of the screw 70 is in contact with the object to be fastened 80, and the Z-axis position determined by a position of a screw head is substantially constant during the screw fastening operation. In addition, when a fault caused by the bottoming does not occur, even during the final fastening process, the screw shaft 72 of the screw 70 extends and an axial force (fastening force) is generated, but at that time, the Z-axis position (a position of a head of the screw 70) hardly changes.

On the other hand, when a fault caused by the bottoming occurs, at the start of the final fastening process, the seat surface 71 of the screw 70 is not always in contact with the object to be fastened 80, and the Z-axis position determined by the position of the screw head varies between screw fastening operations. In addition, when a fault caused by the bottoming occurs, during the final fastening process, the front end 73 of the screw 70 or the bottom 82 of the screw hole 81 is deformed, the screw 70 enters the screw hole 81, and thereby the Z-axis position varies greatly for each screw.

In this way, at the start of the final fastening process and during the final fastening process, the Z-axis position does not show any variation when a fault caused by the bottoming does not occur, and the Z-axis position greatly varies when a fault caused by the bottoming occurs. On the other hand, at the start of the final fastening process and during the final fastening process, even when a fault caused by the bottoming does not occur, the R-axis position varies for each screw fastening operation due to the influence of a friction on a contact surface between the seat surface 71 of the screw 70 and the object to be fastened 80, or other influences.

Thus, the fault assessment unit 14 is not affected by a tolerance of each screw, and assesses whether a fault caused by the bottoming has occurred in the screw fastening based on the amount of change in the Z-axis position where the position is stable at the start of the final fastening process and during the final fastening process when a fault caused by the bottoming does not occur. Thereby, the fault assessment unit 14 can assess the occurrence of a fault with high precision.

In addition, for example, the fault assessment unit 14 can also assess whether a fault caused by the bottoming has occurred based on an absolute value of the Z-axis position at the start of the final fastening process. However, in this case, the fault assessment unit 14 is affected by the tolerance of the screw, and slight bottoming cannot be assessed when the influence of the tolerance of the screw is taken into consideration. Thus, by assessing whether a fault caused by the bottoming has occurred in the screw fastening based on the amount of change in the Z-axis position from the time of the temporary seating, the occurrence of a fault can be assessed with high precision.

Meanwhile, because the completion of the temporary seating process is detected according to that the rotation torque applied to the driver 50 reaches the first torque, as shown in (a) of FIG. 5 and (b) of FIG. 5, the completion of the temporary seating process is detected earlier when a fault caused by the bottoming occurs in the screw fastening than when a fault caused by the bottoming does not occur.

Therefore, the final fastening process is started earlier and the variation in a start timing of the final fastening process is greater when a fault caused by the bottoming occurs in the screw fastening than when a fault caused by the bottoming does not occur.

In a first position acquisition step, first, the position acquisition unit 13 inserts the screw 70 into the screw hole 81, and acquires, as a first position, the axial position of the driver 50 when the screw 70 is temporarily seated.

Subsequently, in a second position acquisition step, the position acquisition unit 13 acquires, as a second position, the axial position of the driver 50 in the final fastening process after the screw 70 is temporarily seated.

The position acquisition unit 13 may acquire the first position at the start timing of the final fastening process, and may acquire the second position every predetermined time (for example, every 0.002 seconds) after the acquisition of the first position.

The fault assessment unit 14 refers to the first position and the second position acquired by the position acquisition unit 13 in a fault assessing step. In the fault assessing step, the fault assessment unit 14 assesses that a fault has occurred in the screw fastening when the amount of change from the first position to the second position is greater (becomes greater) than the threshold value. For example, the fault assessment unit 14 assesses that a fault has occurred in the screw fastening when the amount of change from the first position to the second position acquired at the start timing of the final fastening process is greater than the threshold value.

When the fault assessment unit 14 assesses that a fault caused by the bottoming that the front end 73 of the screw 70 reaches the bottom 82 of the screw hole 81 has occurred in the screw fastening, the PLC 10 notifies a user or another equipment of the occurrence of this fault by a function of the notification unit 15.

In addition, when the fault assessment unit 14 assesses that a fault has occurred in the screw fastening, the PLC 10 may notify the screw fastening device 5 of the occurrence of a fault caused by the bottoming by the function of the notification unit 15 and suspend the screw fastening operation. In addition, a presentation device (not shown) may be notified of the occurrence of the fault caused by the bottoming, and the occurrence of the fault caused by the bottoming may be presented to the user by image display, audio output, or the like.

As described above, because the screw fastening system 1 assesses that a fault has occurred in the screw fastening when the amount of change in the Z-axis position of the driver 50 from the time of the temporary seating is greater than the threshold value, the screw fastening system 1 can accurately assess whether a fault caused by the bottoming has occurred.

Embodiment 2

Hereinafter, Embodiment 2 of the present invention is described in detail. Moreover, for convenience of description, the same reference sign is added to a member having the same function as the member described in the above Embodiment 1, and the description thereof is not be repeated.

The configuration of the screw fastening system 1 according to Embodiment 2 is the same as that of the screw fastening system 1 of Embodiment 1 described with reference to FIGS. 1 to 3. The screw fastening system 1 according to Embodiment 2 is different from Embodiment 1 in assessing whether a fault caused by foreign matter clamping has occurred in the screw fastening.

(Foreign Matter Clamping Assessment)

Next, processing is described in which the foreign matter clamping is assessed with reference to the amount of change in the axial position of the driver 50 from the time of the temporary seating.

Figure 8:
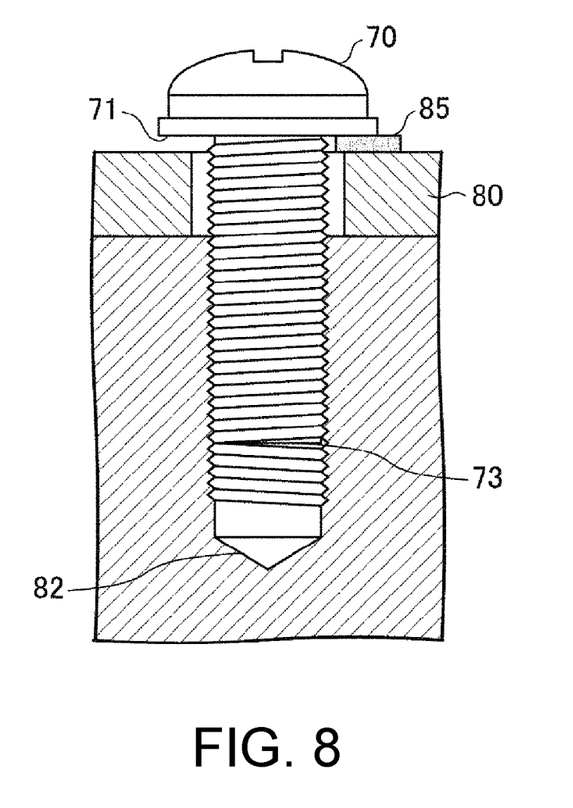
FIG. 8 is a diagram schematically showing a screw having a fault caused by foreign matter clamping.
(a) of FIG. 9 is a diagram showing changes in the R-axis position during the final fastening process, and (b) of FIG. 9 is a diagram showing changes in the Z-axis position during the final fastening process.

FIG. 8 is a diagram schematically showing the screw 70 in which a fault caused by the foreign matter clamping occurs. As shown in FIG. 8, there is a case in which the screw fastening operation is performed in a state where a foreign matter 85 is clamped between the seat surface 71 of the screw 70 for fastening the object to be fastened 80 to the workpiece 90 and the object to be fastened 80. In this case, a fault caused by the "foreign matter clamping" in which the screw fastening operation stops halfway occurs. The foreign matter 85 is, for example, aluminum scrap, a solder ball, or the like.

In the final fastening process described above, the position acquisition unit 13 acquires the R-axis position and the Z-axis position from the coupler 20 via the communication unit 12. Here, the R-axis position is the amount of rotation of the servo for rotation 30, and the Z-axis position is the moving distance from the origin position.

The fault assessment unit 14 assesses whether a fault caused by the foreign matter clamping has occurred in the screw fastening based on the axial position of the driver 50 acquired by the position acquisition unit 13.

Figure 9:
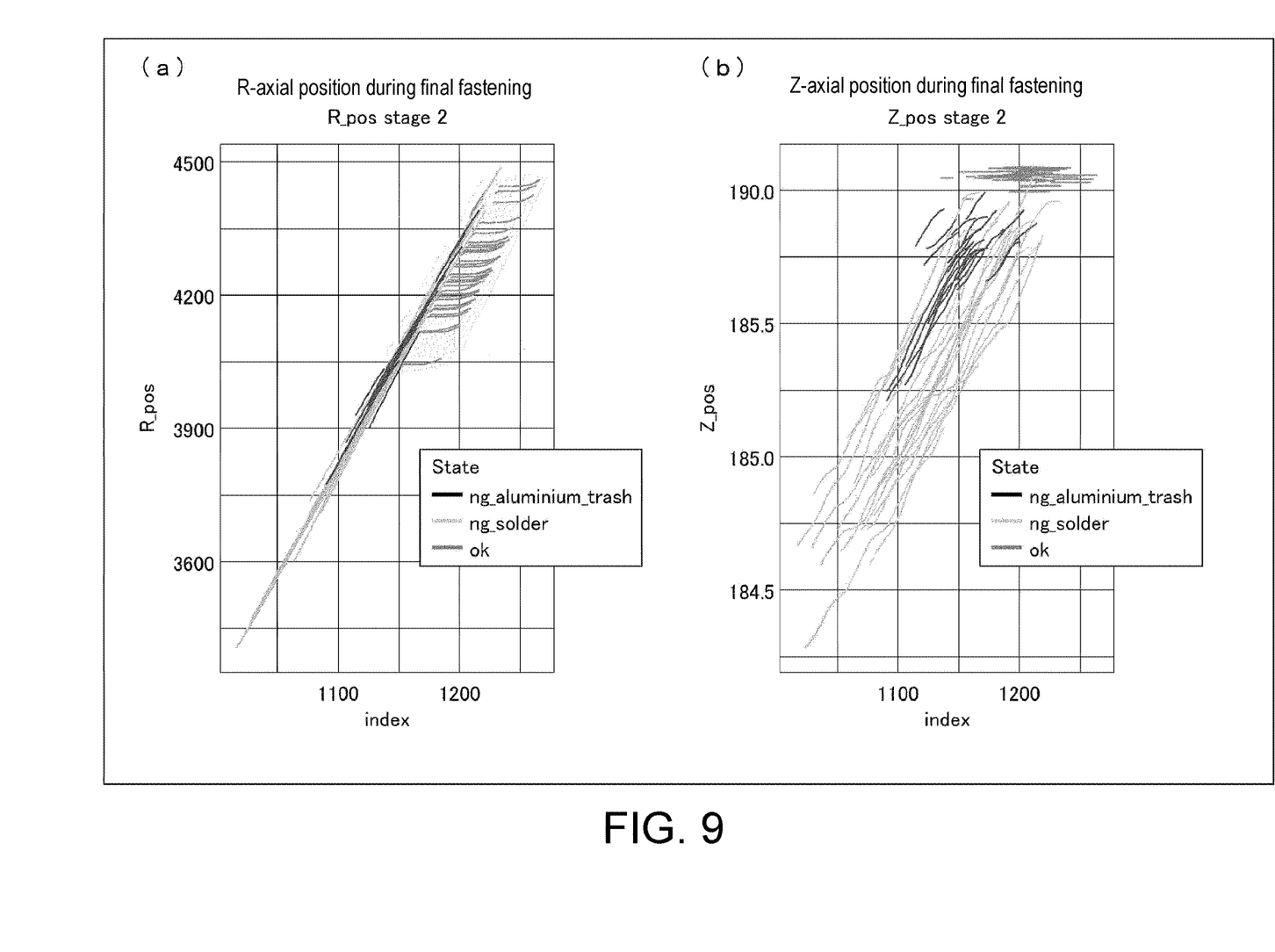

(a) of FIG. 9 is a diagram showing changes in the R-axis position during the final fastening process between a case when the foreign matter clamping occurs and a case when the screw fastening operation is completed without any problem. In (a) of FIG. 9, ng_aluminium_trash shows changes in the R-axis position when a fault caused by the clamping of the aluminum scrap occurs, and ng_solder shows changes in the R-axis position when a fault caused by the clamping of the solder ball occurs. A horizontal axis shows time, and a vertical axis shows the R-axis position.

(b) of FIG. 9 is a diagram showing changes in the Z-axis position during the final fastening process between the case when the foreign matter clamping occurs and the case when the screw fastening operation is completed without any problem. In (b) of FIG. 9, ng_aluminium_trash shows changes in the Z-axis position when a fault caused by the clamping of the aluminum scrap occurs, and ng_solder shows changes in the Z-axis position when a fault caused by the clamping of the solder ball occurs. A horizontal axis shows time, and a vertical axis shows the Z-axis position. In (a) of FIG. 9 and (b) of FIG. 9, as for an index, 1 index indicates 2 msec, and in a case of index=1250, the time is 2.5-second.

Figure 10:
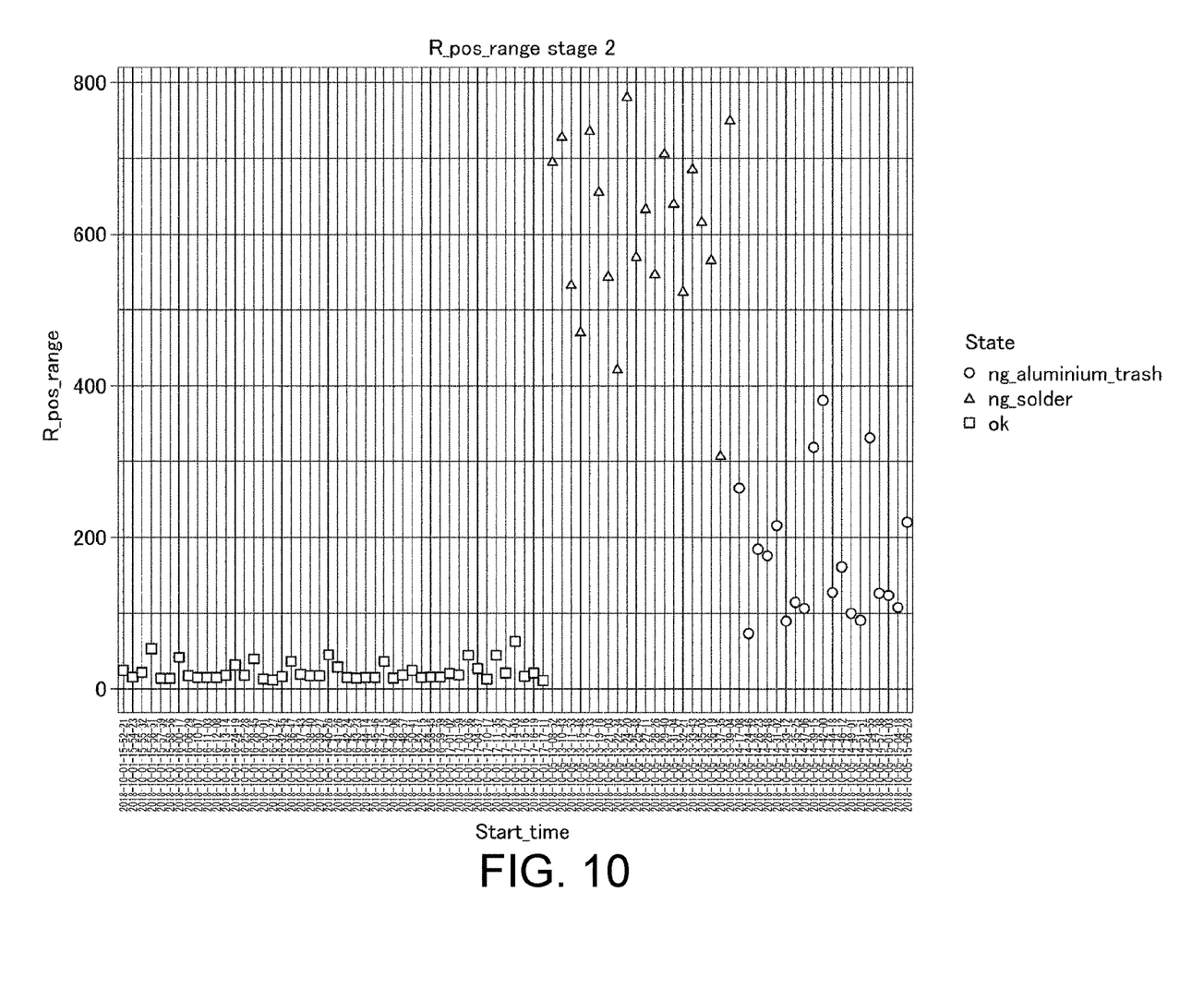
FIG. 10 is a diagram showing the amount of change in the R-axis position during the final fastening process.

FIG. 10 is a diagram showing the amount of change in the R-axis position during the final fastening process of each screw between the case when the foreign matter clamping occurs (ng_aluminium_trash or ng_solder) and the case when the foreign matter clamping does not occur (ok). A horizontal axis shows a start time of the screw fastening of each screw, and a vertical axis shows the amount of change in the R-axis position.

As shown in (a) of FIG. 9 and (b) of FIG. 9, during the final fastening process, the amount of change in the R-axis position and the amount of change in the Z-axis position of the driver 50 associated with changes in time is greater when a fault caused by the foreign matter clamping occurs in the screw fastening than when a fault caused by the foreign matter clamping does not occur. The fault assessment unit 14 assesses that a fault caused by the foreign matter clamping has occurred in the screw fastening when the amount of change in the axial position of the driver 50 from the time of the temporary seating is greater than the threshold value in the final fastening process.

Between the amount of change in the R-axis position and the amount of change in the Z-axis position of the driver 50 when a fault caused by the foreign matter clamping does not occur, the amount of change in the R-axis position has a greater variation for each screw. This is because the amount of change in the R-axis position is likely to be affected by a friction between the screw and the object to be fastened, a torque variation, or the like.

Similar to the influence of a fault caused by the bottoming described with reference to FIG. 6, even when a fault caused by the foreign matter clamping does not occur, the amount of change in the Z-axis position in the final fastening process hardly varies for each screw fastening operation. On the other hand, when a fault caused by the foreign matter clamping occurs, the amount of change in the Z-axis position in the final fastening process varies greatly for each screw fastening operation.

As shown in FIG. 10, even when a fault caused by the foreign matter clamping does not occur, the R-axis position at the start of the final fastening process varies for each screw fastening operation. This is because the R-axis position at the start of the final fastening process varies for each screw fastening operation by the influence of a friction on contact surfaces between the seat surface 71 of the screw 70, the object to be fastened 80, and the foreign matter 85, or other influences.

Thus, the fault assessment unit 14 is not affected by a tolerance of each screw, and assesses whether a fault caused by the foreign matter clamping has occurred in the screw fastening based on the amount of change in the Z-axis position where the position is stable at the start of the final fastening process and during the final fastening process when a fault caused by the foreign matter clamping does not occur. Thereby, the fault assessment unit 14 can assess the occurrence of a fault with high precision.

When the fault assessment unit 14 assesses that a fault has occurred in the screw fastening, the notification unit 15 notifies the user or another equipment including the screw fastening device 5 of the occurrence of the fault caused by the clamping of the foreign matter between the seat surface 71 of the screw and the object to be fastened 80.

As described above, because the screw fastening system 1 assesses that a fault caused by the foreign matter clamping has occurred in the screw fastening when the amount of change in the Z-axis position of the driver 50 from the time of the temporary seating is greater than the threshold value, the screw fastening system 1 can assess, with high precision, whether a fault caused by the foreign matter clamping has occurred.

CONCLUSION

As described in Embodiment 1 and Embodiment 2, the PLC 10 includes the position acquisition unit 13 that acquires the axial position of the driver 50, and the fault assessment unit which assesses that a fault caused by the bottoming or the foreign matter clamping has occurred in the screw fastening when the amount of change in the Z-axial position of the driver 50 from the time of the temporary seating is greater than the threshold value in the final fastening process after the screw is inserted to the screw hole and the screw is temporarily seated. Thus, a fault of the screw fastening can be assessed with high precision based on the Z-axial position of the driver 50 without being affected by the tolerance of the screw, the friction between the screw and the object to be fastened during the final fastening process, and the like.

The screw fastening fault assessment device according to one aspect of the present invention includes the position acquisition unit that acquires the axial position of the driver, and the fault assessment unit which assesses that a fault has occurred in the screw fastening when the amount of change in the axial position of the driver from the time of the temporary seating is greater than the threshold value in the final fastening process after the screw is inserted into the screw hole and the screw is temporarily seated.

In addition, in order to solve the above problems, a screw fastening fault assessment method according to one aspect of the present invention includes: a first position acquisition step of acquiring, as the first position, the axial position of the driver when the screw is inserted into the screw hole and the screw is temporarily seated; a second position acquisition step of acquiring, as the second position, the axial position of the driver in the final fastening process after the screw is temporarily seated; and a fault assessing step of assessing that a fault has occurred in the screw fastening when the amount of change from the first position to the second position is greater than the threshold value.

According to the above configuration, the quality of the screw fastening is assessed based on the amount of change in the axial position of the driver from the time of the temporary seating. The amount of change from the time of the temporary seating has little variation. For example, in the final fastening process, even if the screw is stretched, the axial position of the driver is not affected. Therefore, the quality of the screw fastening can be assessed with high precision.

In addition, in the screw fastening fault assessment device according to the aspect of the present invention, the time of the temporary seating is a time point at which the seat surface of the inserted screw is in contact with the object to be fastened.

According to the above configuration, when there is no fault, the amount of change in the axial position of the driver is small, and the quality of the screw fastening is assessed based on the amount of change in the final fastening process after the time point when the seat surface of the screw is in contact with the object to be fastened. Therefore, the quality of screw fastening can be assessed with high precision.

In addition, in the screw fastening fault assessment device according to one aspect of the present invention, the temporary seating process in which the screw is inserted into the screw hole and the screw is temporarily seated is performed until the rotation torque applied to the driver reaches the first torque smaller than the fastening torque of the screw.

According to the above configuration, because the temporary seating process is completed depending on the rotation torque applied to the driver, the screw is not overfastened in the temporary seating process, and the quality of screw fastening in the final fastening process after the temporary seating process can be assessed with high precision based on the amount of change in the axial position of the driver from the time of the temporary seating.

In addition, in the screw fastening fault assessment device according to one aspect of the present invention, the final fastening process after the temporary seating process is performed until the rotation torque applied to the driver reaches the second torque which is the fastening torque.

For example, the second torque is a specified fastening torque. According to the above configuration, the quality of screw fastening can be assessed with high precision based on the amount of change in the axial position of the driver after temporary seating occurred until the completion of final fastening.

In addition, the screw fastening fault assessment device according to one aspect of the present invention includes the notification unit which notifies, when the occurrence of a fault in screw fastening is assessed, the occurrence of a fault caused in a manner that the front end of the screw reaches the bottom of the screw hole or the occurrence of a fault caused in a manner that the foreign matter is clamped between the seat surface of the screw and the object to be fastened.

According to the above configuration, the occurrence of a fault of the screw fastening due to the bottoming or the foreign matter clamping can be notified as a type of a fault of the screw fastening. For example, the user can take measures according to the type of a fault of the screw fastening.

In addition, in order to solve the above problems, the screw fastening device according to one aspect of the present invention includes the screw fastening fault assessment device, the first motor that applies the rotation torque to the driver, and the second motor that moves the driver in the axial direction.

According to the above configuration, based on the rotation torque of the first motor, the temporary seating process and the final fastening process can be controlled, and the quality of the screw fastening can be assessed according to the amount of movement of the driver to the axial direction by the second motor. Thus, in the final fastening process, the quality of the screw fastening can be assessed.

In addition, in order to solve the above problems, a control program according to one aspect of the present invention is used for making a computer function as the screw fastening fault assessment device, and function as the position acquisition unit and the fault assessment unit.

According to the above configuration, the quality of the screw fastening can be assessed with high precision by the control program.

[Realization Example by Software]

A control block of the PLC 10 (particularly, the control unit 11, the communication unit 12, the position acquisition unit 13, the fault assessment unit 14, and the notification unit 15) may be realized by a logic circuit (hardware) formed in an integrated circuit (IC chip) or the like, or may be realized by software.

In the latter case, the PLC 10 includes a computer executing instructions of a program which is the software that realizes each function. The computer includes, for example, one or more processors and a computer-readable recording medium that stores the program. Then, in the computer, the processor reads the program from the recording medium and executes the program, and thereby the purpose of the present invention is achieved. As the processor, for example, a central processing unit (CPU) can be used. As the recording medium, a "non-temporary tangible medium", for example, in addition to a read only memory (ROM) or the like, a tape, a disk, a card, a semiconductor memory, a programmable logic circuit, or the like can be used. In addition, a random access memory (RAM) for developing the program or the like may be further included. In addition, the program may be supplied to the computer via an arbitrary transmission medium (a communication network, a broadcast wave, or the like) capable of transmitting this program. Moreover, one aspect of the present invention can also be realized in the form of a data signal embedded in a carrier wave, in which the program is embodied by electronic transmission.

The present invention is not limited to each embodiment described above, and various modifications can be made within the scope of the claims. The technical scope of the present invention also includes embodiments obtained by appropriately combining the technical means disclosed respectively in the different embodiments.

What is claimed is:

1. A screw fastening fault assessment device comprising a processor being configured to:
   acquire an axial position of a driver; and
   assess that a fault has occurred in screw fastening when an amount of change from a first position to a second position in the axial position of the driver is greater than a threshold value during a final fastening process;
   wherein the processor is configured to perform the final fastening process from a time of temporary seating after a screw is inserted into a screw hole and the screw is temporarily seated; and
   wherein the first position is an axial position of the driver when the screw is temporary seated, wherein the second position is an axial position of the driver in the final fastening process after the screw is temporarily seated.

2. The screw fastening fault assessment device according to claim 1, wherein the time of the temporary seating is a time point at which a seat surface of the inserted screw is in contact with an object to be fastened.

3. The screw fastening fault assessment device according to claim 1, wherein the processor is configured to perform a temporary seating process until a rotation torque applied to the driver reaches a first torque smaller than a fastening torque of the screw, in which the screw is inserted into the screw hole and the screw is temporarily seated.

4. The screw fastening fault assessment device according to claim 3, wherein the processor is configured to perform the final fastening process after the temporary seating process until the rotation torque applied to the driver reaches a second torque which is the fastening torque.

5. The screw fastening fault assessment device according to claim 1, wherein the processor is configured to notify, when an occurrence of a fault in the screw fastening is assessed, either the occurrence of the fault is caused in a manner that a front end of the screw reaches a bottom of the screw hole or the occurrence of the fault is caused in a manner that a foreign matter is clamped between a seat surface of the screw and the object to be fastened.

6. A screw fastening device, comprising:
   the screw fastening fault assessment device according to claim 1;
   a first motor that applies a rotation torque to a driver; and
   a second motor that moves the driver in an axial direction.

7. The screw fastening device according to claim 6, wherein the processor is configured to suspend screw fastening when occurrence of a fault in the screw fastening is assessed.

8. A screw fastening fault assessment method, comprising:
   a first position acquisition step of acquiring, as a first position, an axial position of a driver when a screw is inserted into a screw hole and the screw is temporarily seated;
   a second position acquisition step of acquiring, as a second position, the axial position of the driver in a final fastening process after the screw is temporarily seated; and
   a fault assessing step of assessing that a fault has occurred in the screw fastening when the amount of change from the first position to the second position is greater than a threshold value.

9. A non-transitory computer readable recording medium storing a control program which is executed by a computer to:
   acquire an axial position of a driver; and
   assess that a fault has occurred in screw fastening when an amount of change from a first position to a second position in the axial position of the driver is greater than a threshold value during a final fastening process;
   wherein perform the final fastening process from a time of temporary seating after a screw is inserted into a screw hole and the screw is temporarily seated; and
   wherein the first position is an axial position of the driver when the screw is temporary seated, wherein the second position is an axial position of the driver in the final fastening process after the screw is temporarily seated.

* * * * *